C. P. LINDEN.
EYEGLASS MOUNTING.
APPLICATION FILED MAR. 27, 1913.
1,121,190.
Patented Dec. 15, 1914.
2 SHEETS—SHEET 1.
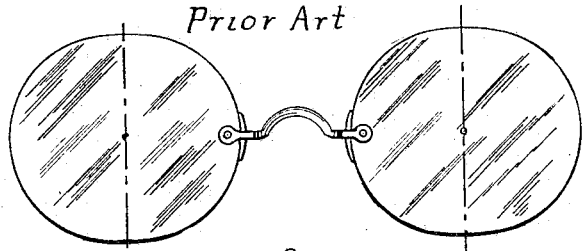
Fig. 1. *Prior Art*
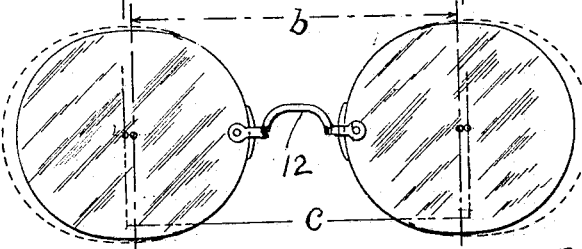
Fig. 2.
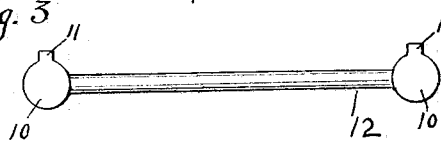
Fig. 3.
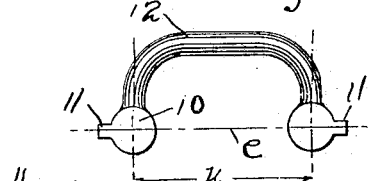
Fig. 3ᵃ
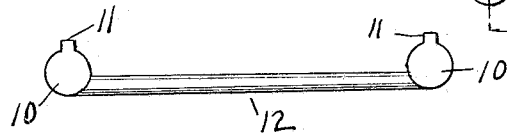
Fig. 4.
Fig. 3ᵇ
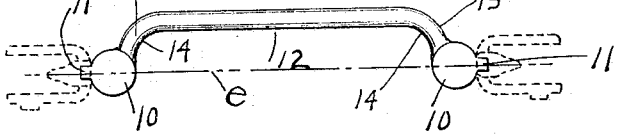
Fig. 5.
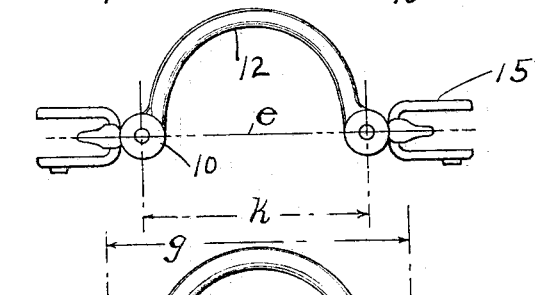
Fig. 6.
Fig. 7. *Prior Art*
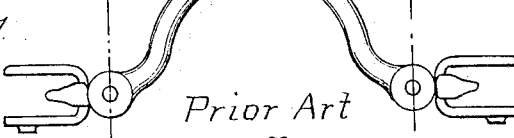
Witnesses
W. W. Bardsley
E. D. Ogden
Inventor
Carl P. Linden
By
Howard E. Barlow
Attorney C. P. LINDEN.
EYEGLASS MOUNTING.
APPLICATION FILED MAR. 27, 1913.
1,121,190.
Patented Dec. 15, 1914.
2 SHEETS—SHEET 2.
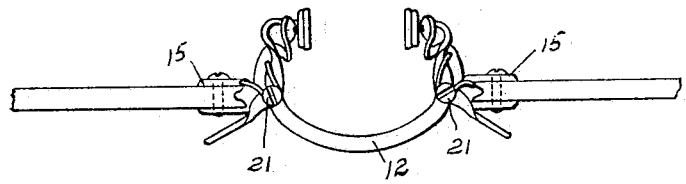
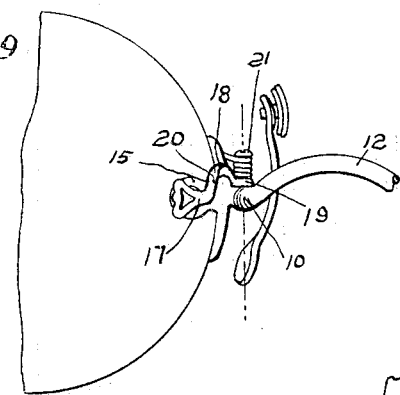
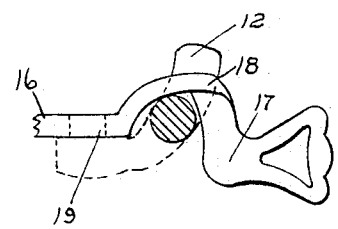
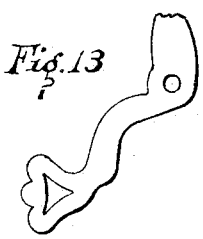
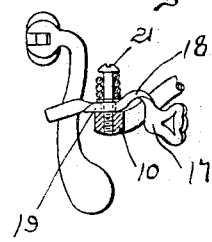
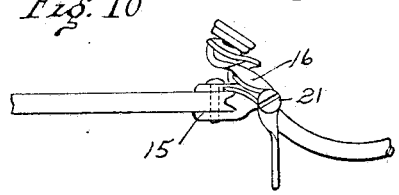
Witnesses
John F. Cavanagh
E. D. Ogden
Inventor
Carl P. Linden
Howard E. Barlow
Attorney

UNITED STATES PATENT OFFICE.

CARL P. LINDEN, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

EYEGLASS-MOUNTING.

1,121,190. Specification of Letters Patent. Patented Dec. 15, 1914.

Application filed March 27, 1913. Serial No. 757,153.

*To all whom it may concern:*

Be it known that I, CARL P. LINDEN, a citizen of the United States, and resident of the city of Providence, in the county of Providence and State of Rhode Island, have invented certain new and useful Improvements in Eyeglass-Mountings, of which the following is a specification.

This invention relates to eyeglass mountings more particularly to that form having nose clamp lenses pivoted adjacent the opposite ends of the bridge, and the object of the invention is to provide an improved bridge member in which the nose space between the lenses is reduced to the minimum and whereby the pupillary distance between the lenses may be considerably shortened over the mountings now in use, or when it is not desired to so reduce the pupillary distance to the minimum much larger lenses may be set in a mounting of this construction if desired.

A further object of my improved mounting is to form the forwardly projecting portion of the nose grip arms with an upwardly curved loop, and also to begin its lateral extension immediately forward of its pivoting point whereby the close setting of the bridge portion will not interfere with the opening swing of the arms thereby permitting the maximum opening of the nose grips before said arm contacts with the bridge. In the ordinary old style mounting this loop or lateral projection in the arms was not required, as heretofore it has been deemed necessary to shape the bridge so as to permit this arm to swing, which shape necessitated the spreading of the pivot bearing lugs and flattening the bridge at the point of connection. That is to say, by my improved construction the arch portion of the bridge terminates at each end with a lug, said arch portion extending from the lugs at substantially right angles to the medial line through said lugs, by which construction the maximum space between the lugs is obtained permitting the pupillary distance of the lenses to be reduced to the minimum, but this construction of so connecting the bridge to the lugs, does not leave sufficient room for the ordinary nose grip arm to swing, therefore to overcome this difficulty I loop the pivoted nose grip arm upwardly above the plane of the pivoting portion and then bend the same downward in line with the center of the lens clamps, whereby the arm is permitted to receive its maximum opening swing without contacting with the arch portion of the bridge. In other words, instead of shaping the bridge to permit the arm to swing I shape the arm to accommodate itself to the new form of bridge.

With these and other objects in view, the invention consists of certain novel features of construction, as will be more fully described and particularly pointed out in the appended claims.

Of the accompanying drawings: Figure 1— illustrates the fixed pupillary distance $a$ of the old style mounting. Fig. 2— illustrates the relative shortening of the pupillary distance $b$ by the use of my new style of bridge. Fig. 3— illustrates the preferred form showing the lugs formed centrally at the ends of the bridge portion. Fig. 3$^a$— shows the arch as formed with its ends extending from the lugs at right angles to the medial line through said lugs. Fig. 3$^b$— is a side elevation showing the arch extending outward from the lugs as constructed in Figs. 3 and 3$^a$. Fig. 4— shows another form in which the lugs are offset from the axis of the wires. Fig. 5— illustrates the first bend of the arch portion of the bridge outward. Fig. 6— illustrates the second bend of the bridge and the lens clamps positioned on the riveting bosses. Fig. 7— illustrates the old style of bridge illustrating the relatively greater distance between the pivoting center of the lugs. Fig. 8— is a plan view illustrating the nose gripping arms pivoted on a mounting containing my improved bridge. Fig. 9— is a front elevation showing the loop in the grip arm for the purpose of permitting the same to receive its opening swing on my improved form of bridge. Fig. 10— is a plan view showing the arm as swung to its open position. Fig. 11— is a side elevation showing the loop in the arm. Fig. 12— is an enlarged side elevation illustrating the loop in the arm and a cross section of the arch showing its position relative to the arm when the same is swung to open position. Fig. 13— is an enlarged view showing the lateral offset in the arm immediately forward of the pivoting point which together with the upward bend at this point permits the arm to swing to its open position before contacting with the bridge.

One disadvantage found in the construction of the usual finger piece mounting has been that it is difficult to reduce the pupillary distance to properly fit the eyes of some people. Then again, in order to obtain the proper pupillary distance it has been necessary to use comparatively small lenses. I have sought to overcome these objections by forming or shaping the bridge portion so as to obtain the minimum distance between the pivoting points on the lugs at its extremities, which construction is herein described in detail.

It is found in the practical construction of the bridge members for eyeglasses to be of great advantage to form them primarily from round wire which already possesses a polished surface and which by a very slight operation can be shaped in the form required for the bridge portion. On the ends of this wire 12 are formed enlarged portions or lugs 10—10 having a flattened upper face, the same being formed centrally with the axis of the wire, as illustrated in Figs. 3, 3$^a$ and 3$^b$, or the same may be constructed so that one edge of the wire will be tangent with the inner surface of the lugs and riveting bosses 11—11 are formed on this lug on a line at substantially a right angle to the axis of the bridge portion, as illustrated in Figs. 3 and 4. The next operation is to bend the bridge from the form illustrated in Figs. 3 and 4 to that illustrated in Fig. 5 by carrying the arch portion 12 forward, thereby giving the riveting bosses 11 a quarter turn outward causing them to set on the medial line $e$ through the center of the lugs 10. This bending of the arch portion 12 causes the portions 13 thereof to extend forwardly from the lugs, and in Fig. 5 inner surface 14 is shown as being tangent to the inner surface of the lugs, said surfaces intersecting the surface of the lug substantially at the medial line $e$ through said lugs whereby none of the arch portion of the bridge extends into the space between the inner surface of the lugs, but the preferred form is to position the lugs centrally on the bridge portion, both of which constructions have the effect of reducing the distance between these lugs to the minimum. The arch portion 12 of the bridge may be bent forwardly and upwardly any desired amount to suit requirements. After the bridge has been thus formed the lens clamps 15—15 may be attached thereto by passing the rivet bosses through corresponding apertures in the base of the clamp and heading them over, or any other suitable means may be employed for connecting these lens clamps to the bridge member.

By the use of the usual bridge member it will be seen by the illustration in Fig. 1 that the pupillary distance is fixed to the distance shown by the line $a$, while by the use of my improved bridge member the pupillary distance using the same size of lens, may be relatively shortened to the length of line $b$, see Fig. 2, or the pupillary distance may be maintained the same as indicated by line $c$, and larger lenses, as illustrated in dotted lines in Fig. 2, may be set in the mounting. This reduction of pupillary distance is obtained by the difference in the construction of the bridge member, as illustrated in Figs. 3$^a$, 6 and 7, Fig. 7 showing the ordinary construction of bridge member, the distance between the pivoting points of gripping arms being illustrated at $g$, while Figs. 3$^a$ and 6 illustrate the relative shortening of this distance as shown at $k$.

In constructing a bridge member in the form above described it is found that when the ordinary nose grip arm which extends straight forward from the pivoting point, is mounted on the bridge lugs it is impossible to swing the same to open the grips sufficiently as it at once comes in contact with the arch, therefore in order to obviate this difficulty I have provided a grip member 16 provided with a forwardly extending arm 17, which arm is bent, looped or otherwise formed with an upward curve as at 18 above the plane of the portion 18 where it is pivoted to the lug 10. The arm is then carried downward as at 20, see Fig. 9, into line with the lens clamp 15 which latter is desirable in this class of mounting. In some cases it is also found desirable to laterally offset that portion of the arm which is immediately forward of the pivoting point, which together with the upwardly looped or bent portion at this point permits the arm to swing to its open position before contacting with the bridge.

I claim:

1. A bridge construction for an eye glass mounting of the finger lever type, said bridge comprising an arch portion terminating at each end directly with a lug, the ends of said arch portion being formed with said lugs and extending forwardly therefrom at substantially right angles to the medial line through said lugs, whereby the maximum space between the lugs is obtained to reduce the pupillary distance of the lenses to the minimum.

2. A bridge construction for an eye glass mounting of the finger lever type, said bridge comprising an arch portion terminating at each end directly with a lug, the ends of said arch portion being formed with said lugs and extending forwardly therefrom at substantially right angles to the medial line through said lugs, whereby the maximum space between the lugs is obtained to reduce the pupillary distance of the lenses to the minimum, and lens clamps formed independently and secured to the sides of said lugs at substantially a right angle to the point of connection of the arch, said clamps being in alinement with each other and substantially on said medial line.

3. In an eye glass mounting, a bridge comprising a central arch portion terminating at each end with a lug, said arch portion extending forwardly from said lugs at substantially right angles to the medial line through said lugs, whereby the maximum space between the lugs is obtained reducing the pupillary distance of the lenses to the minimum, in combination with a nose clamp arm having that portion immediately forward of its pivoting point offset, whereby said arm is permitted to receive its maximum opening swing before contacting with the arch portion of said forwardly extending bridge.

4. In an eye glass mounting, a bridge comprising a central arch portion terminating at each end with a lug, said arch portion extending forwardly from said lugs at substantially right angles to the medial line through said lugs, whereby the maximum space between the lugs is obtained reducing the pupillary distance of the lenses to the minimum, in combination with a nose clamp arm having that portion immediately forward of its pivoting point looped upwardly, whereby said arm is permitted to receive its maximum opening swing before contacting with the arch portion of the bridge.

5. In an eye glass mounting, a bridge comprising a central arch portion terminating at each end with a lug, said arch portion extending forwardly from said lugs at substantially right angles to the medial line through said lugs, whereby the maximum space between the lugs is obtained reducing the pupillary distance of the lenses to the minimum, in combination with a nose clamp arm having that portion immediately forward of its pivoting point looped upwardly and offset laterally, whereby said arm is permitted to receive its maximum opening swing before contacting with the forwardly extending arch portion of the bridge.

6. In an eye glass mounting, a bridge comprising a central arch portion terminating at each end with a lug, said arch portion extending forwardly from said lugs at substantially right angles to the medial line through said lugs, whereby the maximum space between the lugs is obtained reducing the pupillary distance of the lenses to the minimum, in combination with a nose clamp arm having a pivot receiving portion and that portion immediately forward of said pivoting portion looped upwardly above the plane thereof, offset laterally and then carried downward to bring its end in line with the center of said lens clamps whereby said arm is permitted to receive its maximum opening swing before contacting with the arch portion of the bridge.

In testimony whereof I affix my signature in presence of two witnesses.

CARL P. LINDEN.

Witnesses:
HOWARD E. BARLOW,
E. I. OGDEN.